United States Patent
Fenn et al.

(10) Patent No.: US 7,392,736 B2
(45) Date of Patent: Jul. 1, 2008

(54) PISTON-CYLINDER UNIT WITH A PROTECTIVE SLEEVE

(75) Inventors: Gerald Fenn, Pfersdorf (DE); Daehun Gwon, Kyung-Nam (KR); Jonghyuk Lee, Jyung-Nam (KR); Taewon Kim, Kyung-Nam (KR)

(73) Assignee: ZF Friedrichshafen AG, Friedrichshafen (DE)

( * ) Notice: Subject to any disclaimer, the term of this patent is extended or adjusted under 35 U.S.C. 154(b) by 330 days.

(21) Appl. No.: 11/359,210

(22) Filed: Feb. 22, 2006

(65) Prior Publication Data

US 2006/0213366 A1 Sep. 28, 2006

(30) Foreign Application Priority Data

Feb. 23, 2005 (DE) .................. 10 2005 008 045

(51) Int. Cl.
*F16F 9/38* (2006.01)
(52) U.S. Cl. ...................... 92/51; 188/322.12
(58) Field of Classification Search .................. 92/51; 188/322.12
See application file for complete search history.

(56) References Cited

U.S. PATENT DOCUMENTS 4,167,991 A 9/1979 Karklins et al.

2001/0018863 A1 9/2001 Heinz et al.

FOREIGN PATENT DOCUMENTS

| DE | 1 874 288 | 6/1963 |
| DE | 1 951 754 | 12/1966 |
| DE | 1 995 281 | 10/1968 |
| DE | 7 111 581 | 6/1971 |
| DE | 44 40 808 | 2/1996 |
| JP | 05-52388 | 7/1993 |
| JP | 2004-116711 | 4/2004 |

*Primary Examiner*—F. Daniel Lopez
(74) *Attorney, Agent, or Firm*—Cohen Pontani Lieberman & Pavane LLP

(57) ABSTRACT

A piston-cylinder unit includes a piston rod guided axially in a cylinder, a support disk fixed to the piston rod, a mounting element fixed to the support disk, and a protective sleeve which can be threaded over the mounting element. The protective sleeve has an end wall with an aperture profiled to receive the mounting element therethrough as the protective sleeve is fitted to the support disk, the protective sleeve being rotatable relative to the mounting element when fitted to the support disk, the mounting element having an axial support surface which can be positioned axially above the end wall to retain the protective sleeve.

7 Claims, 3 Drawing Sheets

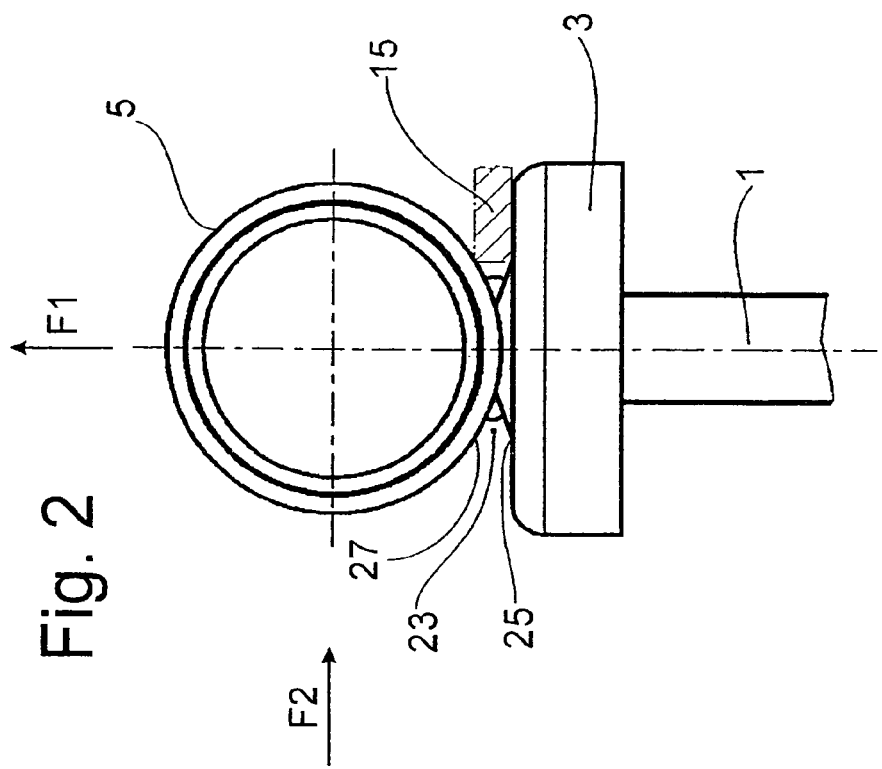
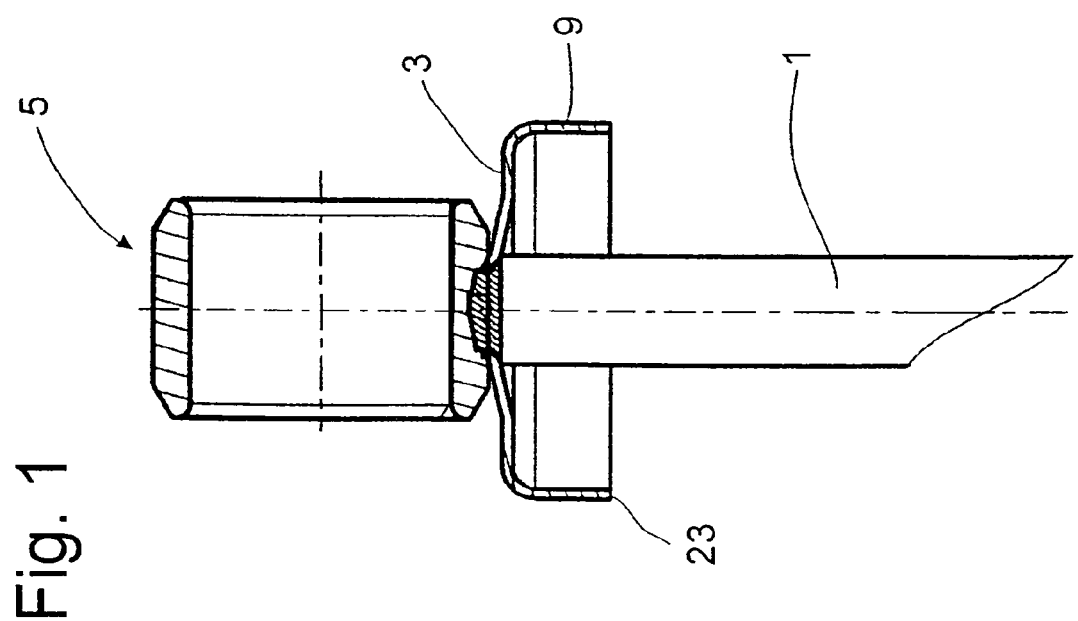

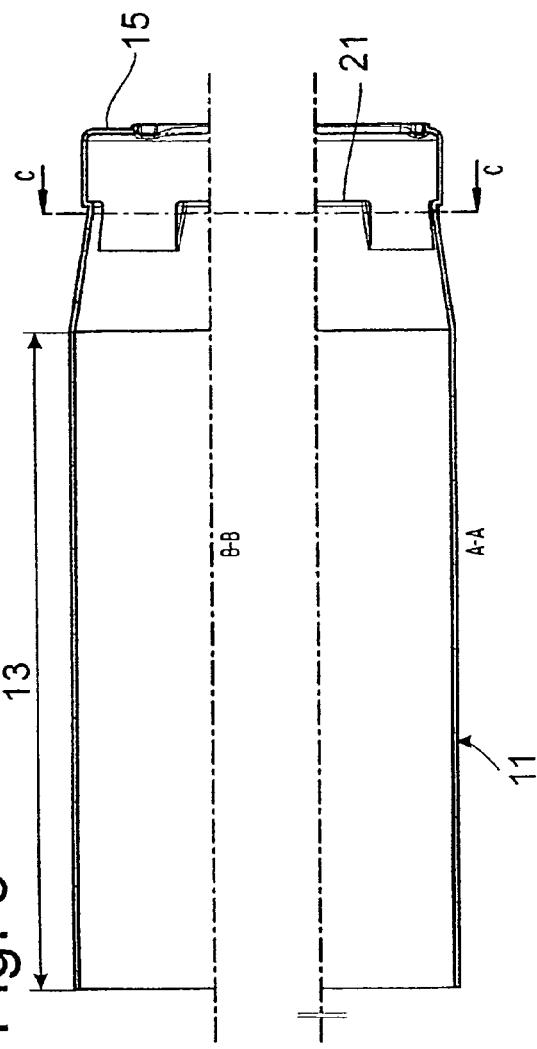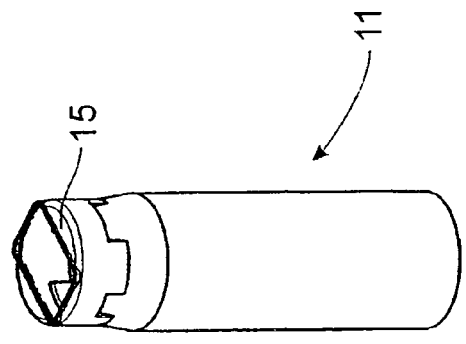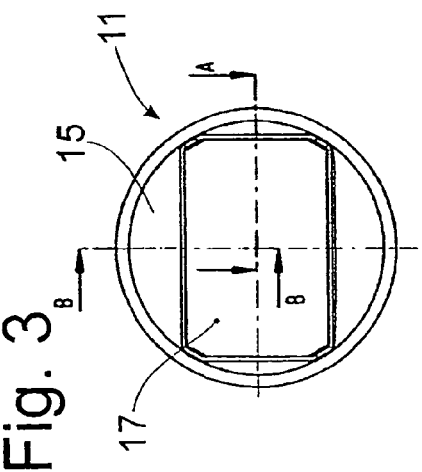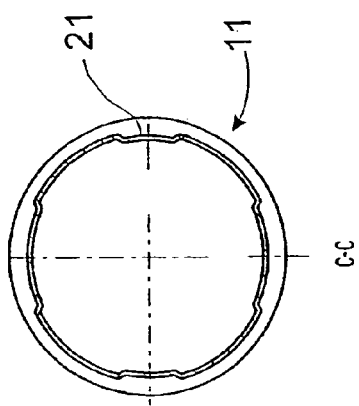

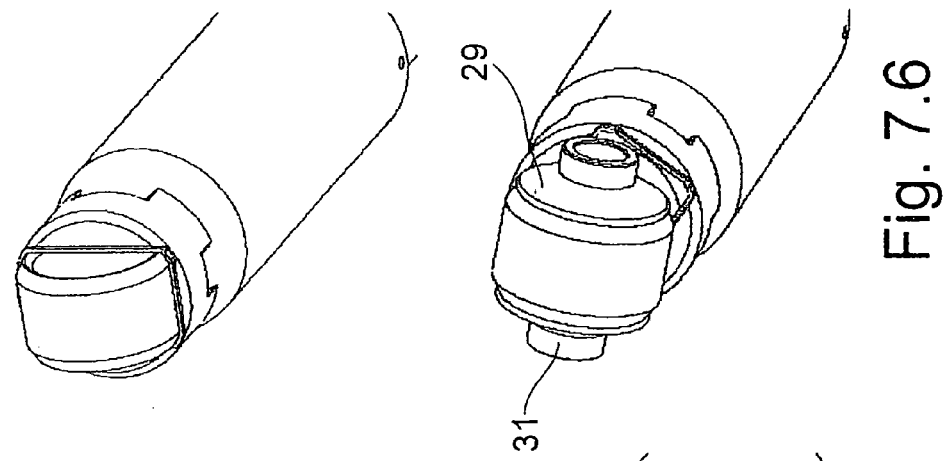
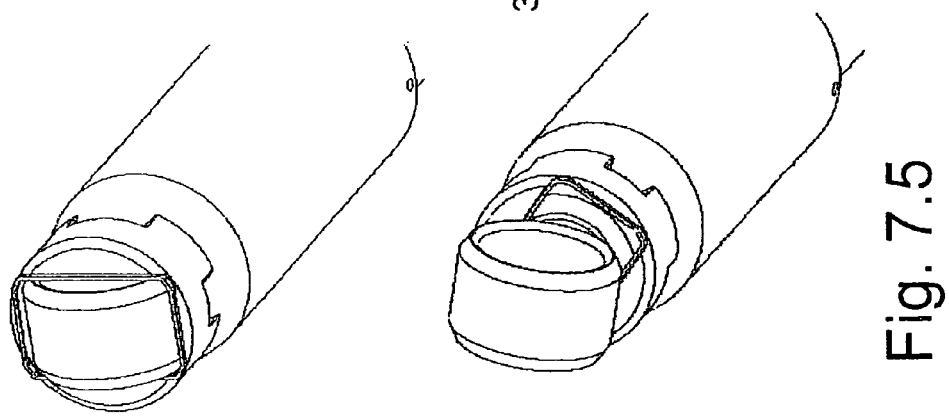
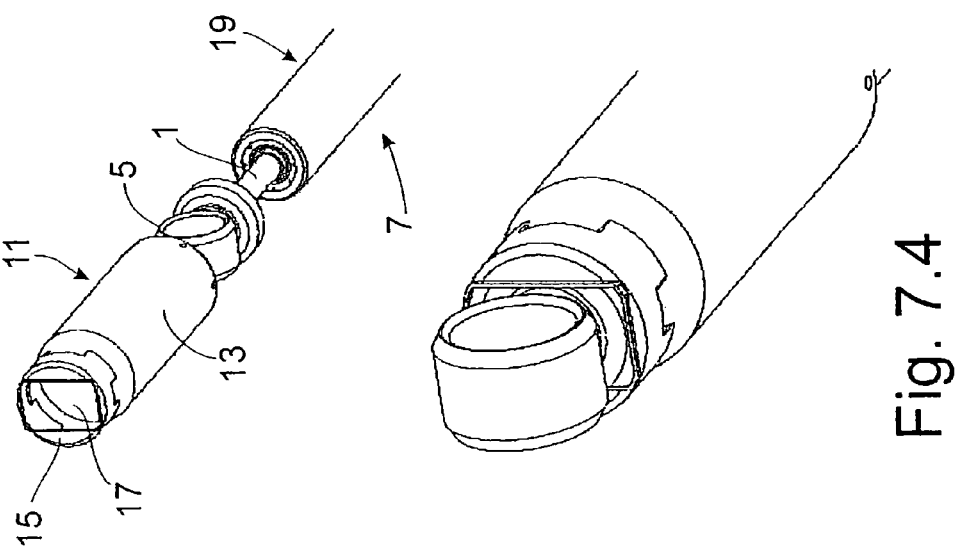

PISTON-CYLINDER UNIT WITH A PROTECTIVE SLEEVE

BACKGROUND OF THE INVENTION

1. Field of the Invention

The invention pertains to a piston-cylinder unit with a protective sleeve which can be fitted over a mounting unit on the end of the piston rod.

2. Description of the Related Art

A piston-cylinder unit in the form of a gas spring, for example, or a vibration damper, consists primarily of a cylinder with an end part and a piston rod with a piston at one end and a mounting element at the other end, as well as a piston rod guide between the two ends, which, when the two main components are assembled, are pushed into the cylinder and rolled, beaded, or screwed in the area of the piston rod guide.

The piston rod assembly also includes a protective sleeve, which is intended to protect the piston rod against mechanical damage. The protective sleeve is often so long, that, when the piston rod is in its maximum outward-travel position, there is a slight overlap between the protective sleeve and the cylinder. As a result, it may not be possible to roll or bead the cylinder in the area of the piston rod guide. Another difficulty is that the cylinder cannot be painted until after the assembly process is complete. In DE 1 995 281 U and in DE 1 951 754 U, a support disk is attached to the piston rod, and the protective sleeve is attached to the disk. In the design according to DE 1 995 281 U, the protective sleeve can be pushed over the mounting element afterwards. This protective sleeve has no end part. The protective sleeve according to DE 1 951 754 U does not have an end part either. So that the protective sleeve can be aligned with the cylinder with sufficient precision in spite of this, the support disk is provided with a guide sleeve, but this sleeve must again be of sufficient length.

U.S. Pat. No. 4,167,991 also discloses a protective sleeve for a vibration damper. This sleeve is made of flat strip material and is mounted radially on a profiled retaining disk, after which the two edges are butt-welded together.

U.S. Pat. No. 6,474,216 pertains to a vibration damper with a protective sleeve, which can also be attached to support disk at the end of the assembly process. A radially split connecting ring, which has a guide bushing for the protective sleeve, can be pushed onto the support disk of the piston rod. The guide bushing has a circumferential groove, into which the protective sleeve can be pushed from the direction of the cylinder to secure the connecting ring in place. This design principle can be applied to conventional vibration dampers or gas springs, but it is often not possible to apply it to spring struts with wheel or axle mounts, because the radial dimension of the mounts is larger than the inside diameter of the protective sleeve, and thus the tube cannot be pushed over the cylinder toward the support disk.

SUMMARY OF THE INVENTION

The task of the present invention is to realize a piston-cylinder unit in which a protective sleeve can be mounted on the piston rod side after the piston rod has been installed in the cylinder.

According to the invention, the protective sleeve has an end wall, which is provided with an aperture for the mounting element, Where the protective sleeve is designed so that it can rotate with respect to the mounting element, and where the mounting element has an axial support surface for the protective sleeve.

The great advantage of the invention is that the protective sleeve can be mounted at the conclusion of the assembly process, and at the same time the protective sleeve is secured firmly in position by the simplest of means.

To increase the strength of the connection between the protective sleeve and the mounting element, the protective sleeve and the end wall are designed as a one-piece unit. Angle errors between the protective sleeve and the piston rod or the cylinder are also minimized.

In another advantageous embodiment, the aperture corresponds to the projection of a top view of the mounting element onto the cylinder. The end wall has a maximum cross section so that it can absorb transverse forces.

The projection of the mounting element has a noncircular external contour. As a result of the noncircular profiles of the mounting element and the aperture, the mounting element acquires the previously mentioned support surface for the axial fixation of the protective sleeve.

According to an advantageous embodiment, the mounting element is designed as a ring bearing. As a result, it is possible to make use of a proven design.

To hold the protective sleeve in place during the assembly process, the protective sleeve and the support disk together form a positive connection acting in the axial direction.

For this purpose, the protective sleeve has radial retaining surfaces, which engage with the side of the support disk facing away from the mounting element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a cross section through the structural unit consisting of the piston rod and the mounting element;

FIG. 2 is a side view of the unit according to FIG. 1;

FIG. 3 is a top view of the protective sleeve according to the invention;

FIG. 4 is a cross-section of the sleeve taken along the line C-C of FIG. 5;

FIG. 5 is a cross-section of the sleeve take along the lines A-A and B-B of FIG. 3;

FIG. 6 is a perspective view of the protective sleeve; and

FIGS. 7.1-7.6 show the assembly sequence of the protective sleeve to the structural unit.

DETAILED DESCRIPTION OF THE PRESENTLY PREFERRED EMBODIMENTS

FIG. 1 shows a structural unit comprising the piston rod 1, the support disk 3, and the mounting element 5, for a piston-cylinder unit 7 according to FIGS. 7.1-7.6. The support disk 3, which has a circumferential collar 9, parallel to the axis of the piston rod, is welded to the end surface of the piston rod 1. The top surface of the support disk 3 is connected to the mounting element 5, which is designed as a ring bearing. In its projection onto the piston rod, the mounting element 5 has a noncircular external contour (FIG. 7.1).

FIGS. 3-7 pertain to the protective sleeve 11 for the piston rod according to FIG. 1. The protective sleeve 11 has a tubular section 13 with a constant cross section and an end wall 15. The end part and the tubular section form a one-piece unit (FIG. 5). The protective sleeve is preferably made of plastic. In the top view according to FIG. 3, it can be seen that the end wall has an aperture 17, which corresponds to the projection of a top view of the mounting element 5 onto the cylinder 19 of the piston-cylinder unit 7. That is, the cross section of the aperture 17 corresponds to the largest radial dimension of the mounting element 5.

By looking at FIGS. 4 and 5 together, it can be seen that the protective sleeve 11 has radial retaining surfaces 21, which can engage with the side of the support disk 3 facing away from the mounting element 5. The distance between the retaining surfaces 21 and the bottom surface of the end wall 15 is approximately the same as the distance between the top surface of the support disk 3 and the end surface of the circumferential collar 9. For the sake of clarity, FIG. 6 shows a perspective view of the protective sleeve 11.

FIGS. 7.1-7.6 are intended to illustrate the sequence of steps of the assembly process for the piston-cylinder unit 7. In FIG. 7.1, the piston-cylinder unit 7 can be seen with its cylinder 19, the piston rod 1, and a partially installed mounting element 5. In a first assembly step, the tubular section 13 of the protective sleeve 11 is threaded over the mounting element 5, for which purpose the aperture 17 is lined up with the ring bearing 5. FIGS. 7.2 and 7.3 show intermediate stages of the process of pushing the ring bearing through the aperture 17. Because the projection of the ring bearing is rectangular, the shape of the aperture 17 is also rectangular.

In FIG. 7.4, the protective sleeve 11 has reached is final axial position, in which the end wall 15 is resting against the support disk 3. The retaining surfaces 21 on the protective sleeve 11 are now engaged with the circumferential rim 9 and form a positive connection, so that the protective sleeve is held axially in position in both directions with respect to the structural unit formed by the piston rod and ring bearing.

As shown in FIG. 7.5, the protective sleeve 11 is now rotated relative to the support disk 3 and the ring bearing 5. As a matter of principle, the cross section of the ring bearing, projected onto the cylinder, decreases continuously from the equator to the side closest to the support disk, which means that a gap is formed between the aperture 17 and the ring bearing 5. This gap allows the protective sleeve to be rotated versus the ring bearing. It can be seen in FIGS. 1 and 2 that the ring bearing 5 cooperates with the support disk 3 to form a circumferential gap 23, into which part of the end wall 15 the protective sleeve 11 can be introduced as a result of the rotational movement. The contours of the ring bearing 5 and of the support disk 3 forming the boundaries of the ring-shaped gap form support surfaces 25, 27, which become positioned above and below the end wall 15 and thus hold the protective sleeve 11 in position independently of the positive connection between the collar 9 and the retaining surfaces 21 which hold the support disk 3.

When the protective sleeve 11 has reached its final position, the mounting element 5 is then fitted with a ring-shaped elastomeric body 29 and an internal bushing 31 (FIG. 7.6).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder unit comprising:
   a piston rod guided axially in a cylinder;
   a support disk fixed to the piston rod;
   a mounting element fixed to the support disk;
   a protective sleeve having an end wall with an aperture profiled to receive the mounting element therethrough as the protective sleeve is fitted to the support disk, the protective sleeve being rotatable relative to the mounting element when fitted to the support disk, the mounting element having an axial support surface which can be positioned axially above the end wall to retain the protective sleeve.

2. The piston-cylinder unit of claim 1 wherein the end wall is formed as one piece with the protective sleeve.

3. The piston-cylinder unit of claim 1 wherein the aperture has a profile which substantially matches a profile of the mounting element as seen from axially above the mounting element.

4. The piston-cylinder unit of claim 3 wherein the profile of the mounting element has a non-circular external contour.

5. The piston-cylinder unit of claim 1 wherein the mounting element is a ring bearing.

6. The piston-cylinder unit of claim 1 wherein the protective sleeve forms a positive axial connection to the support disk when fitted, regardless of angular orientation.

7. The piston cylinder unit of claim 6 wherein the support disk has a circumferential collar with a rim facing away from the mounting element, the protective sleeve having radial retaining surfaces which engage the rim to retain the sleeve.

\* \* \* \* \*